United States Patent [19]

von Stein et al.

[11] 4,264,196
[45] Apr. 28, 1981

[54] METHOD AND APPARATUS FOR MAKING COLOR PRINTS IN AUTOMATIC DEPENDENCE UPON THE FILM TYPE INVOLVED

[75] Inventors: Werner von Stein, Hamburg; Berthold Fergg, Taufkirchen, both of Fed. Rep. of Germany

[73] Assignee: AGFA-Gevaert, A.G., Leverkusen, Fed. Rep. of Germany

[21] Appl. No.: 958,484

[22] Filed: Nov. 7, 1978

[30] Foreign Application Priority Data

Nov. 7, 1977 [DE] Fed. Rep. of Germany ....... 2749721

[51] Int. Cl.³ .............................................. G03B 27/52
[52] U.S. Cl. ........................................ 355/41; 355/38
[58] Field of Search ..................... 355/35, 38, 39–43, 355/67, 68, 77, 83, 88; 354/105–109, 21; 352/78 C

[56] References Cited

U.S. PATENT DOCUMENTS

| | | | |
|---|---|---|---|
| 3,422,740 | 1/1969 | Nerwin | 352/78 C X |
| 3,447,871 | 6/1969 | Neale | 355/38 |
| 3,600,089 | 8/1971 | Skillman | 355/40 X |
| 3,797,025 | 3/1974 | Murphy, Jr. et al. | 355/40 X |
| 3,888,580 | 6/1975 | Amano et al. | 355/38 |
| 3,987,467 | 10/1976 | Cowles | 355/40 X |
| 4,079,388 | 3/1978 | Takahama et al. | 355/41 X |
| 4,080,061 | 3/1978 | von Stein et al. | 355/38 |
| 4,128,330 | 12/1978 | Fergg et al. | 355/40 X |

*Primary Examiner*—L. T. Hix
*Assistant Examiner*—W. J. Brady
*Attorney, Agent, or Firm*—Michael J. Striker

[57] ABSTRACT

A color print machine, which makes prints from developed color film, is provided with an automatic exposure control system. A memory stores control signals for adjusting the automatic exposure control system for predetermined differing color film types and is addressable for selecting the control signals to be furnished for the color film type involved. The color film is provided with machine-readable film-type identifying code markings prior to printing. A code-marking scanner performs machine-reading of the film-type identifying code markings and generates corresponding film-type signals. The memory is addressed, thereby selecting the control signals to be furnished to the automatic exposure control system for the particular color film type involved, in automatic response to the film-type signals.

2 Claims, 5 Drawing Figures

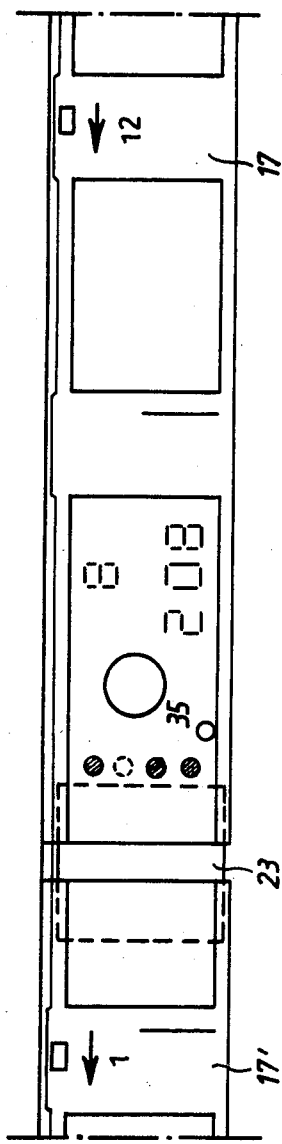
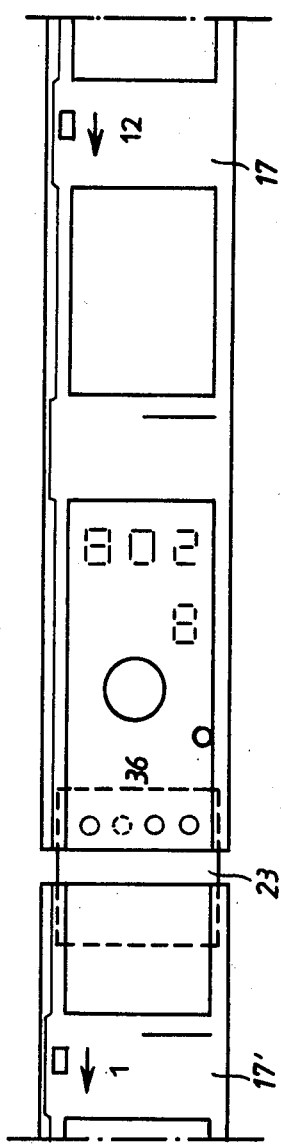
Fig. 2a
Fig. 2b

METHOD AND APPARATUS FOR MAKING COLOR PRINTS IN AUTOMATIC DEPENDENCE UPON THE FILM TYPE INVOLVED

BACKGROUND OF THE INVENTION

The present invention concerns methods and apparatuses for making color prints in dependence upon the characteristics of the particular film type involved, i.e., out of the variety of film types that a particular color print system is called on at different types to process. With methods and systems of this type, the exposure station control system includes a storage storing control signals dependent upon film-type parameter values for various color film types, such as spectral ranges and properties, possibly masking densities, Schwarzschild-exponent values, and so forth. The exposure station control system must be furnished with this information for a particular film type, if the automatic exposure control at the printing station is to be performed properly for the particular film type next to be printed from.

In one known system of this type, this film-type information, or the control signals required for the differing film types which are to be handled, is stored in a so-called calibration memory containing sets of resistors for each color channel. The changeover to the next color film type is implemented by manual switchover or by exchange of modular-plug-in components.

With that system, each time that film of a different type is to be fed into the printing machine, the exposure station control system must be manually switched over or set up again for the new film type. For example, when printing machines are called upon to print from only a few film types, and the differing film types are furthermore developed by differing chemical processes, there is no great difficulty or inconvenience in operating the printing machine, set up for a particular film type, for long periods of time without changing over to another film type. However, when a greater number of differing film types are frequently being received by the machine, and are all to be subjected to identical processing, the problem of setting up the printer for each different film type in succession becomes a serious one.

SUMMARY OF THE INVENTION

It is accordingly the general object of the invention to simplify the whole task of setting-up color printers for successive different film types.

According to the broadest concept of the invention, this is achieved by providing the color film, from which the color prints are to be made, with machine-readable film-type identifying code markings and then, at the printing station, performing machine-reading of the code markings on the film and, in dependence upon the thusly performed film-type identification, performing automatically the adjustments attendant to setting-up the automatic exposure control system for the new film-type.

By furnishing the data concerning film type as machine-readable code markings provided on the film itself, the color printer can be directly given this information, and then, after that point, it is actually quite easy to automatically perform the adjustments attendant to a changeover to a different film-type.

According to a particularly preferred embodiment of the invention, the application of machine-readable code markings to the film is performed prior to film development, at the splicing station at which successive films are spliced end to end to form a lengthy strip for processing. Actually, by applying the machine-readable film-type identifying code markings to the film at the splicing station, the added equipment cost is negligible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 2a and 2b depict, by way of example, two different coding techniques that can be employed;

DESCRIPTION OF THE PREFERRED EMBODIMENTS

Figure 1:
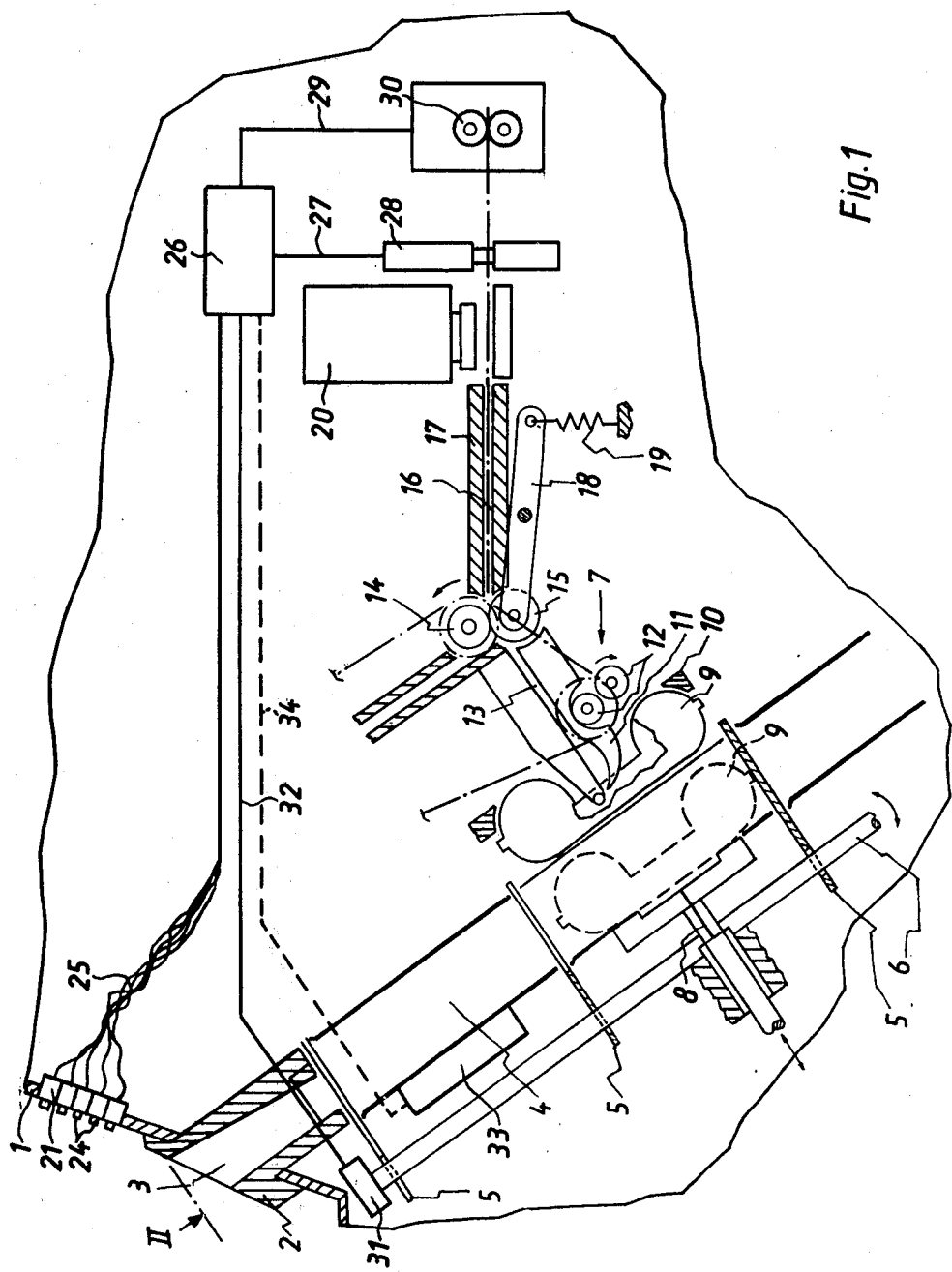
FIG. 1 is a cross-section through a film extracting and splicing station provided with means for applying film-type identifying code markings to the film.

FIG. 1 is a section through an apparatus including the stations at which cassette film to be processed is extracted from the cassettes and the individual films spliced together end to end to form a lengthy strip for automated processing.

Numeral 1 denotes the front panel of the machine. The front panel is provided with an infeed chute 2 with an infeed passage 3 which slants downwards into the interior of the apparatus. The infeed passage 3 is followed by a cassette chute 4 having substantially the same downwards slant. Cassette chute 4 is subdivided into a waiting chamber and a transfer chamber, by means of three rotary sector-type light-blocking plates 5 mounted on a common rotating shaft 6. Light-blocking plates 5 serve to keep ambient light away from an internal film-extracting station 7 during pulling of film from a cassette at that station. The angular spacing of the sector-shaped openings in the three rotary light-blocking plates 5 is such that the openings move into the chute 4 alternately. The middle part of cassette chute 4 is open at its upper longitudinal wall. Located opposite to this opening, at the chute wall directly opposite thereto, is a transfer unit 8 which transfers a film cassette 9 from the broken-line position in chute 4 to the solid-line position at the film-extraction station 7 proper.

The film-extraction station 7 per se includes a stationary stop structure 10 against which the transferred cassette 9 is braced during film extraction; a separating tongue 11 for separating the trailing edge of the rolled-up film from the film roll; a transport roller pair 12; a (non-illustrated) ejector; and a film guide channel 13 followed by a pair of friction rollers 14 and 15. The latter are followed by a generally horizontal film guide structure 16, for deflecting the extracted film 17 to a cutting and splicing station 20. Friction roller 14 is coupled to and driven by a (non-illustrated) motor, whereas friction roller 15 is rotatably mounted on one end of a lever 18, to whose other end one end of a spring 19 is connected, the other spring end being fastened to a stationary part of the machine housing. This part of the apparatus is conventional, and its operation will be familiar to persons skilled in the art.

Front panel 1 is provided with a data input unit 21, essentially comprised of a row of pushbutton switches 24 which are connected via signal lines 25 to a storage unit 26. As explained below, storage unit 26 can be mainly comprised of a shift register. Storage unit 26 is connected via one or more control lines 27 to an encoding station 28 and, via a control line 29, to the drive unit for a pair of transport rollers 30.

The encoding arrangement 28 is preferably a punch unit provided with, for example, four punch members arranged in a row which extends transverse to the film transport direction, the four punch members being individually activatable and therefore activatable in differing combinations. However, equally well, the encoding arrangement 28 could comprise an optical mark-forming device comprising a row of four light sources or light-emitting elements extending transverse to the film transport direction, and likewise individually illuminatable. Because the film is still in a light-sensitive condition, such light-emitting elements can form code markings on the film itself by simple light exposure. One of the two transport rollers 30 is driven by a (non-illustrated) motor controlled via control line 29, whereas the other transport roller is passively driven.

The illustrated apparatus operates as follows:

With one hand, the operator pushes a film cassette 9 into the infeed chute 3 and, with the other hand, presses that one of the pushbutton switches 24 of input unit 21 corresponding to the film-type indicia the operator sees on the cassette. Depending on which pushbutton switch 24 is pressed, one of a corresponding plurality of distinguishable signals is applied to the input of storage unit 26, storage unit 26 registering the applied signal. Storage 26 can mainly comprise a shift register, the input stage of which registers whatever signal results from the particular pushbutton 24 the operator has depressed. If the operator inadvertently presses the wrong pushbutton 24 and wishes to correct his mistake, he can do this by merely pressing the correct pushbutton, the wrong signal registered in the input stage of the shift register being replaced by the signal corresponding to the second-depressed pushbutton. The registered signal corresponding to the most recently depressed pushbutton does not become inaccessible for correction, until after a sector-shaped opening in the uppermost one of the three rotary light-blocking plates 5 has unblocked the cassette chute 4 for insertion of the next cassette 9 and then again blocked the chute, it being assumed that by the time of insertion of the next cassette the operator will no longer be reconsidering his selection for the preceding cassette. I.e., as the next cassette drops into the cassette chute 4, the shift-register storage unit 26 receives a shift pulse, and the signal registered in the input stage of the register shifts to the second stage thereof, now becoming inaccessible for correction. The shift pulses for shift-register storage unit 26 are furnished via a line 32 from a synchronizer 31 coupled to the rotating shaft 6, i.e., to apply a shift pulse to unit 26 when the upper light-blocking plate 5 has unblocked and then reblocked the cassette chute 4.

After three such shift pulses, the leading end of the film or film trailer of the cassette of interest arrives at the splicing station 20, and is there attached by means of a short section of adhesive strip material to the adjoining end of the previous film. After the splice is made, the joined-together film is transported a little further, the transport being interrupted by a signal produced by storage unit 26 and transmitted via control line 29 to the (non-illustrated) motor for the transport rollers 30. The amount of this small transport step is such as to bring to the encoding station 28 either the adhesive splicing tape or the unexposed trailing end of the film (presently constituting the leading end as considered relative to current transport). With the film transport briefly stopped there, the film-type identifying code markings are applied, whether by means of punching or by light exposure. Which marking is to be applied depends upon the signal received by encoding arrangement 28 via line 27 from the shift-register stage storing the signal of interest. After a time interval sufficient to assure that the code markings have been applied, the interrupt-transport signal on control line 29 terminates and film transport resumes.

According to a further concept of the invention, instead of manually performing the input of a film-type identifying signal, a code marking reader can be located in the splicing apparatus for automatically reading film-type identifying markings on the exterior of the cassette 9. In FIG. 1, a code marking reader unit 33 is located in the first or waiting chamber of the cassette chute 4. Reader unit 33 converts the automatically read code markings into a signal which is transmitted via a line 34 to the input of shift-register storage unit 26, as an alternative to manual data input. More recent film cassettes are already provided with machine-readable code markings indentifying film type.

Self-evidently, such an extracting and splicing station could be provided both with a manual data input and an automatic code-marking reader, for manual input of film-type data in the case of cassettes not already provided with the machine-readable film-type markings just referred to.

FIGS. 2a and 2b depict, merely by way of example, two different coding schemes which could be employed. The adjoining ends of two adjoining films 17 and 17' are shown spliced together by a short strip of adhesive tape 23 (indicated in broken lines). In FIG. 2a, up to four circular code markings 35 can be provided, and here only three out of the four are actually provided, by exposing the film end to light from four individually illuminatable light-emitting elements. Accordingly, each film type is represented by a 4-bit word, making for a number of available combinations sufficient for the number of differing film types to be expected. In FIG. 2b, the code markings are constituted by circular perforations 36 stamped through the splicing tape 23. Because the splicing tape 23 is typically not transparent for infrared light, it is then convenient to use infrared light for the subsequent optical detection of these perforations.

It will be understood that other coding techniques can likewise be employed, for example involving notches made at the edge of the film, markings constituted by the application of machine-detectable inks to the film, and so forth, provided that they then be readable by automatic means, whether mechanical, photoelectric, pneumatic, or others.

Figure 3:
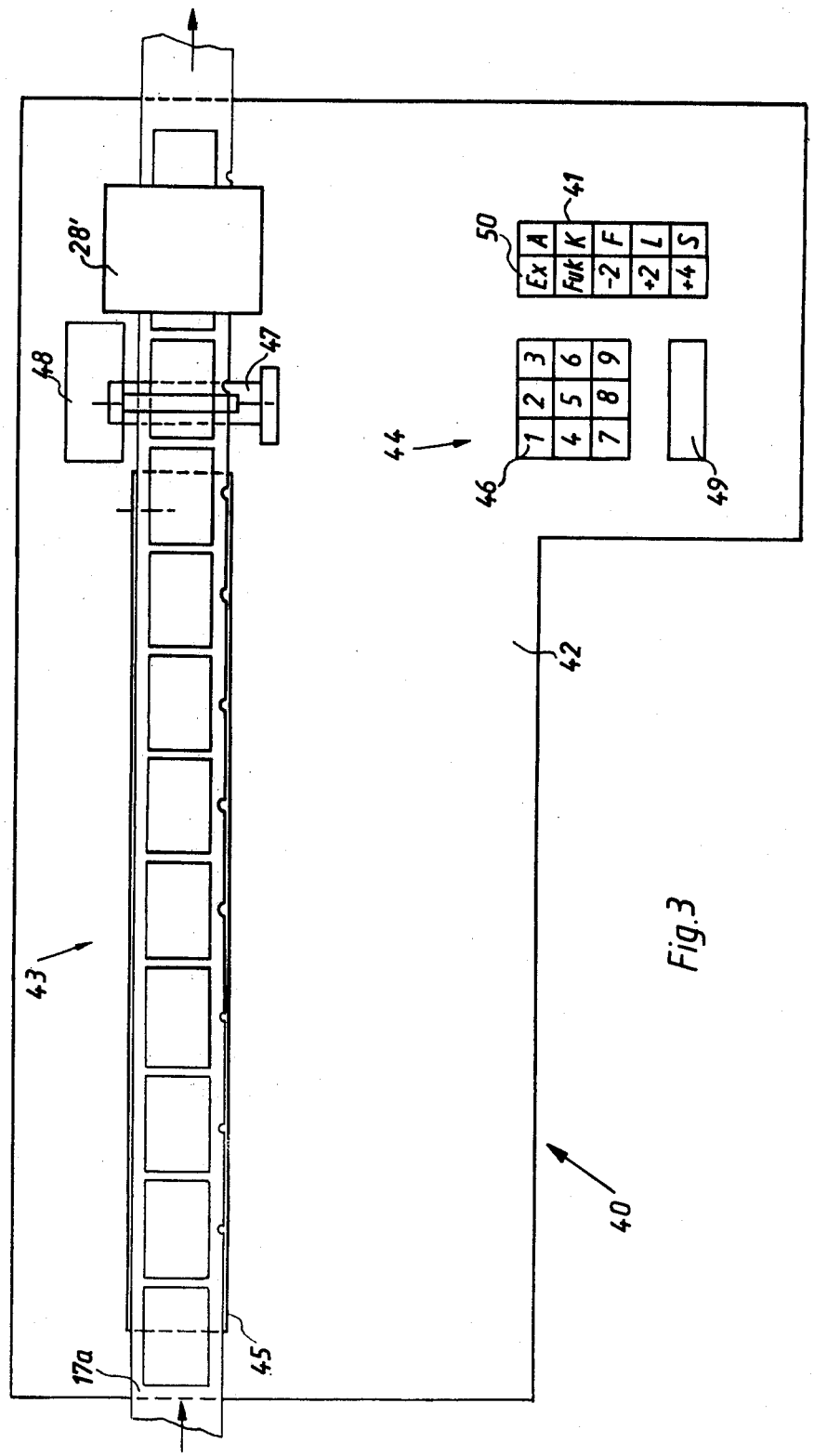
FIG. 3 depicts the provision of such means at a pre-reader station in a film-processing set-up.

Instead of applying the film-type identifying code markings to the film at the splicing station of the film-processing installation, this could alternatively be performed, for example, at the preprinting viewing station at which a human operator visually scans film frames prior to printing in order to ascertain which are unprintable, which ones might require over- or undercorrection, and so forth. FIG. 3 depicts a prereader 40 comprising a control panel 42 at which the operator sits or stands during his work, a display station 43 for developed film about to be printed, and a keyboard 44 used in performing the present invention.

A strip of originals 17a, i.e., frames of developed film, is transported intermittently along the length of a translucent display plate 45 which is illuminated from below. In this way, a predetermined number of originals, here eight, are simultaneously displaced for visual evaluation by the operator. Typically, the operator then presses (non-illustrated) controls, to register signals indicating that certain film frames are unprintable, require exposure corrections, or the like. Preferably, the intermittent film strip transport is performed in such a way that successions of eight frames each are successively brought to a standstill on illuminated display plate 45, for batchwise visual evaluation by the operator. Downstream of display station 43 is a roller 47 forming part of a film-length transducer 48. Film-length transducer 48 is followed by an encoding arrangement 28'. The encoding means employed in encoding arrangement 28' can be of any of the types referred to with respect to FIGS. 1 and 2, e.g., punching, notching, and so forth; however, application of film-type code markings by means of light exposure would not be practicable here, inasmuch as the film is at this point in developed condition. The operator depresses one of a set of pushbutton switches 41, to inform the system of the film type involved; if the operator inadvertently depresses the wrong pushbutton 41, he then presses an erase button 50 and then the correct pushbutton 41, before proceeding further. The operator depresses pushbutton 49, to trigger the next transport step and thereby the display of the next batch of eight originals. A set of pushbutton switches 46 is used to identify the location, within the length of the display panel 45, of the first frame of the new film type. This keyboard 46 may be used, for the same purpose, for identifying which individual film frames might require the printing corrections, or the like, which the operator selects by means of the other (non-illustrated) controls on the control panel 42.

During operation, the operator depresses transport key 49, to bring the next batch of originals into display station 43. If the operator sees the start of a new film type, he depresses one of pushbuttons 41, to register a signal indicating the film type involved, and he presses one of the address keys 46, to store a signal indicating the location of the first frame in the new film type. When the operator resumes strip transport, the film is briefly stopped when the splice at the start of the new film type reaches encoding station 28', and a film-type identifying code marking, corresponding to the depressed pushbutton 41, is applied to the strip of splicing tape or to the adjoining end portion of the film. After a time delay sufficient for application of the code markings, the film transport operation just commanded by the operator automatically resumes without further intervention by the operator. The operator can readily determine what film type is involved from the manufacturer's film-type inscriptions provided along the edge of the film.

Figure 4:
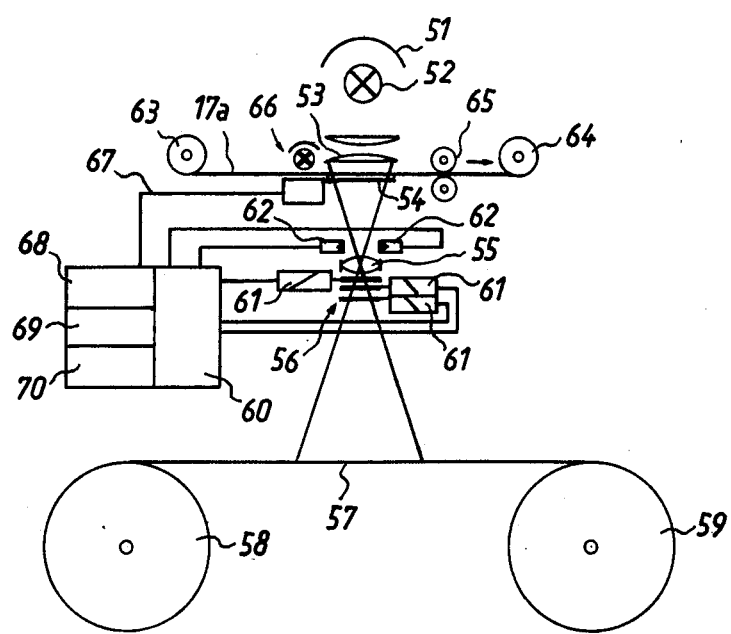
FIG. 4 schematically depicts a color printing station provided with an automatic exposure control system responsive to the film-type identifying code markings on the film from which the color prints are being made.

FIG. 4, now, schematically depicts an exemplary color printing station, at which the film-type indentifying code markings applied in any of the ways described above are actually employed to control color printing.

The printing station is schematically depicted, to the extent of a reflector 51 positioned behind an exposure-light source 52, a condensor 53, a frame 54 for the original to be printed, an objective 55, a set of exchangeable filters 56, and a strip of color print paper 57 transported from a supply roll 58 to a take-up roll 59. Numeral 60 denotes the exposure-control system of the printing station, here, by way of example, shown controlling the energization of three electromagnets 61, for moving different ones of the three filters in filter set 56 into and out of the path of exposure light. The exposure-control system may also include, for example, photoelectric transducers 62 located in the path of exposure light and furnishing exposure-light signals to the exposure-control system. Automatic exposure-control systems are of course in themselves well known in the art, and need not be described in detail here.

A particular film frame 17a to be printed is transported from a supply reel 63 to a take-up reel 64. A pair of transport rollers 65 is located between exposure frame 54 and take-up reel 64. A scanning station 66 is located upstream of the exposure frame 54. Scanning station 66 furnishes film-type identifying signals to a decoder 69 and converts these into a form suitable for application to an adjusting stage 70. Adjusting stage 70, in dependence upon the signals received from decoder 69, adjusts the adjustable components of the automatic exposure control system 60 by automatic means, e.g., by electrically rendering conductive and non-conductive control switches in control system 60 of the type which, in the prior art, a set-up technician might manually switch on and off, by electrically varying the resistance and thereby the time constants or in other manner the time intervals incident to exposure control or the exposure-light intensity value to be employed, and so forth.

When the original 17a of interest passes through scanning station 66, the film-type identifying code markings on or near the film splice 23 are sensed, converted into corresponding signals, and these are furnished via control line 27 (e.g., a set of four control lines transmitting a 4-bit word in parallel) to decoder 69. In response to this film-type identifying signal, decoder 69 furnishes to adjusting stage 70 control signals causing stage 70 to then automatically adjust the adjustable components of automatic exposure control system 60 for the new film-type involved. So long as a different film-type does not arrive, the automatic exposure control system 60 continues to operate as just set up.

If, because of space-availability problems, the scanning station 66 cannot be located immediately upstream of the exposure frame 54, but instead for example upstream thereof a distance corresponding to one or more film frames, then the film-type identifying signal from scanning station 66 can be transmitted to decoder 69 through the intermediary of a time-delay shift register 68 synchronized with one-frame transport operations and having a number of register stages such that the film-type identifying signal becomes applied to decoder 69, with the automatic adjustment of exposure control system 60 then being performed only when the first frame of the new film type actually arrives at exposure frame 54.

Persons skilled in the art will understand that the adjustments of the adjustable components in exposure control system 60, involving as they do for example calibration, slope, exposure duration, filter selection, and so forth, may require signals not per se derivable from the film-type identifying code signal applied to the input of decoder 69. Accordingly, it will typically be necessary, in the case of a sophisticated automatic exposure control system 60, to provide in decoder 69 a program storage, e.g., a random-access memory which is addressed by the undecoded or decoded film-type identifying code signal, with each addressable sector of the memory storing all the various signals predetermining all control signals required for automatic adjustment of exposure control system 60 for a particular film type.

It will be understood that each of the elements described above, or two or more together, may also find a useful application in other types of circuits and constructions differing from the types described above.

While the invention has been illustrated and described as embodied in the context of color-film processing and printing equipment of various specific types, it is not intended to be limited to the details shown, since various modifications and structural changes may be made without departing in any way from the spirit of the present invention.

For example, it is clearly desirable, in the manner described above, to incorporate the encoding arrangement which applies the film-type markings into an existing station of a film-processing and printing installation, e.g., the film-extracting and splicing apparatus of FIG. 1 or the prereader of FIG. 3. However, it will be understood that, if desired, these machine-readable film-type markings could be applied at an entirely separate station of the installation, e.g., involving the introduction of a truly further processing station into the installation.

Without further analysis, the foregoing will so fully reveal the gist of the present invention that others can by applying current knowledge readily adapt if for various applications without omitting features that, from the standpoint of prior art, fairly constitute essential characteristics of the generic or specific aspects of this invention.

What is claimed as new and desired to be protected by Letters Patent is set forth in the appended claims:

1. A film-processing apparatus comprising, in combination, means for transporting film along a predetermined transport path; means for generating differing film-type identifying signals identifying the film type being transported through the apparatus; and means for applying to the film one of a predetermined plurality of distinguishable film-type identifying code markings in response to the film-type identifying signal generated, the apparatus including a compartment for insertion of a film cassette, the means for generating film-type identifying signals comprising means for reading film-type identifying code markings provided on the cassette itself and generating corresponding film-type identifying signals.

2. A film-processing apparatus comprising, in combination, means for transporting film along a predetermined transport path; means for generating differing film-type identifying signals identifying the film type being transported through the apparatus; and means for applying to the film one of a predetermined plurality of distinguishable film-type identifying code markings in response to the film-type identifying signal generated, the apparatus including means for splicing together the adjoining ends of adjoining films at a splicing station, the means for applying the code markings comprising means adjoining the splicing station and providing the code markings adjacent a film splice, furthermore including means operative for receiving a film cassette and automatically extracting the film therefrom, the means for generating film-type identifying signals comprising means for reading film-type identifying code markings provided on the cassette itself and generating corresponding film-type identifying signals.

* * * * *